United States Patent [19]
Casey

[11] 3,915,457
[45] Oct. 28, 1975

[54] INSTRUCTION DEVICE

[76] Inventor: William J. Casey, 3204 Colony Club Road, Pompano Beach, County of Broward, Fla. 33060

[22] Filed: Sept. 23, 1974

[21] Appl. No.: 508,296

[52] U.S. Cl............ 273/183 E; 273/35 A; 35/29 A; 35/58
[51] Int. Cl.² ........................................ A63B 69/36
[58] Field of Search ........ 35/29 A, 58; 273/35, 183, 273/190, 32

[56] References Cited
UNITED STATES PATENTS

| | | | |
|---|---|---|---|
| 1,410,811 | 3/1922 | Lewis | 273/35 A |
| 1,680,016 | 8/1928 | Dawley | 35/58 |
| 2,494,000 | 1/1950 | Robertson | 35/29 A |

*Primary Examiner*—George J. Marlo
*Attorney, Agent, or Firm*—Nolte and Nolte

[57] ABSTRACT

An instruction device is illustrated which comprises a mirror and a transparent carrier sheet with a plurality of superposed images on the sheet, each of which images shows a different stage in a movement to be followed by a trainee. A stand is provided for supporting the sheet in front of the mirror so that the trainee can observe the images on the sheet and his own reflection simultaneously to allow him to follow the movement and to observe any deviations from it. Particularly, the apparatus is designed for instruction in a sports activity, such as in golf, although it might be used for other purposes, and in such an instance, it is desirable that mirror should be convex and disposed at ground level and at an angle so that a trainee can follow his movements without lifting his head.

3 Claims, 4 Drawing Figures

INSTRUCTION DEVICE

This invention is concerned with instruction apparatus, particularly, but not necessarily exclusively, with apparatus for use in giving instruction in a sporting activity.

In a broad aspect, the invention comprises a transparent carrier sheet upon which are superimposed images, which may be photographs or drawings, each image representing a different stage in a movement or activity to be followed by a trainee. The sheet is designed to be inserted in front of a mirror so that a trainee can observe the superimposed images and his own reflection in the mirror so that he can observe how closely he follows the desired movement represented by the images.

The apparatus has particular application in golf instruction, where the images would represent an ideal swing. In such an instance, the images are made to a lesser than life size scale and the mirror is convex so that the trainee's reflection is reduced to substantially the same scale as the images. Most desirably, the mirror would be provided with means for supporting it at an angle at ground level so that a golfer could observe the apparatus while keeping his head down as required for the correct swing.

Typical of the art of which applicant is aware are U.S. Pat. Nos. 1,410,811 (Lewis), 1,558,762 (Richter), 2,939,224 (Rose et al), 3,000,261 (Frenkel) and 3,110,495 (Carter). None of these patents shows the simple technique of the present invention.

An embodiment of the present invention is illustrated, schematically, in the accompanying drawings in which.

Figure 1:
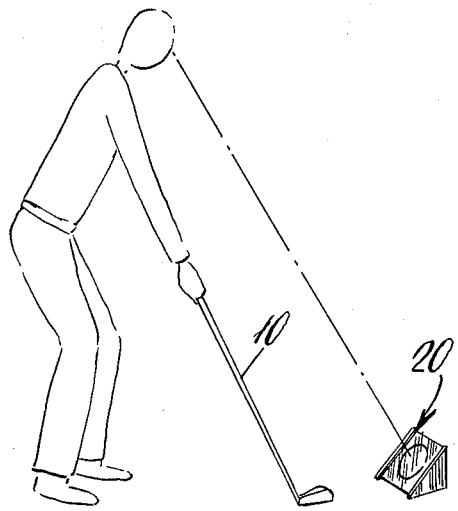
FIG. 1 is a view showing the device in use.
Figure 2:
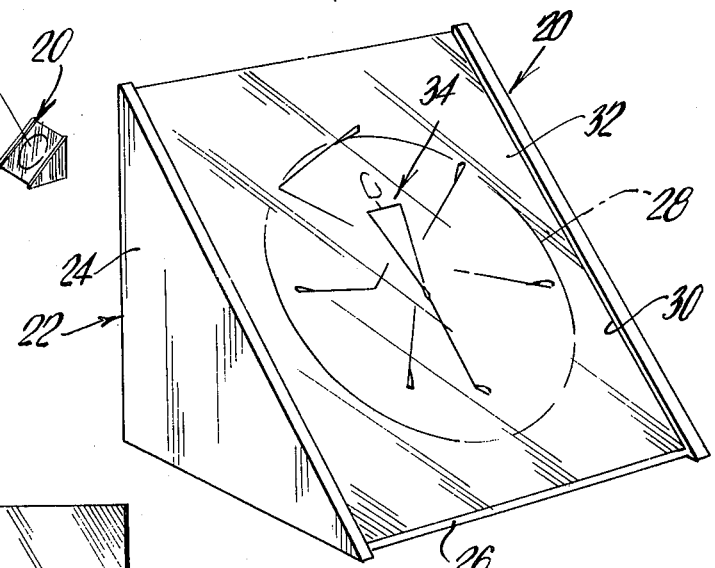
FIG. 2 is a perspective view of the device in FIG. 1 on a larger scale.
Figure 4:
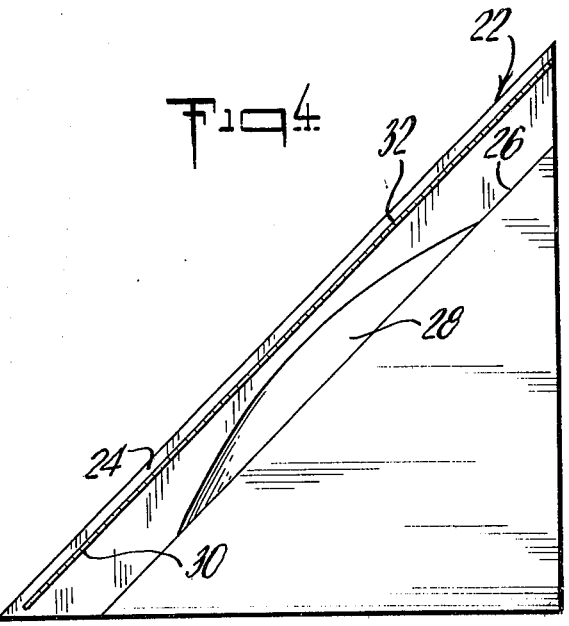
FIG. 4 is a schematic side view of the apparatus of FIG. 2.

In FIG. 1, a trainee is shown with a club 10 practising a golf swing with the help of device 20. The device 20 is illustrated on a greater scale in FIG. 2 and comprises a generally wedge-shaped box having triangular shaped side walls 24 and an inclined front wall 26, the lower edges of said walls serving to support the device on the ground with the front wall 26 inclined. From a consideration of FIG. 4, it will be noted that the front wall 26 is recessed, i.e., it is disposed below the inclined edges of side walls 24.

Figure 3:
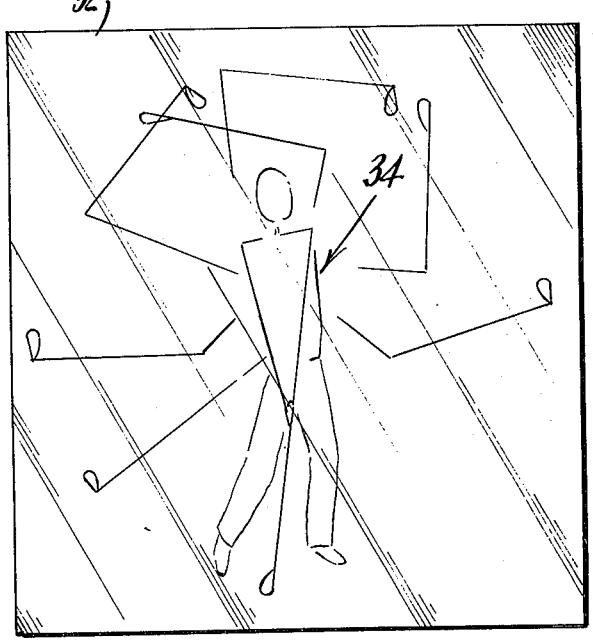
FIG. 3 is a front view of the carrier sheet.

Mounted upon the other side of wall 26 is a convex mirror 28 and the inclined edges of the side walls 24 are provided with grooves 30 for the reception of a carrier sheet such as that illustrated in FIG. 3, so that the carrier sheet will overlie the convex mirror.

In FIG. 3, a typical carrier sheet is shown which comprises a cellophane or other convenient transparent material sheet 32 upon which a plurality of images indicated generally at 34 are printed. The images may be photographic or may be drawn.

It will be appreciated that with the device illustrated in the drawings and particularly as shown in FIG. 1, a trainee, i.e., one taking training or instruction, may observe the images 34 and his own reflection in mirror 28 while keeping his head in the required "down" position.

It will of course be appreciated that the invention is subject to various changes which do not deviate from its scope. Particularly, and to avoid reflection problems, the transparent sheet could, for example, itself be of convex form to closely overlie the surface of mirror 28. Additionally, and while the preferred embodiment has been described with particular reference to the application of the invention to the game of golf, it should be appreciated that the invention has application in other areas, which may be of a sporting nature or otherwise.

I claim:

1. Instruction apparatus comprising a transparent carrier sheet, a plurality of superimposed images each showing an instruction figure in a different stage of a movement to be followed by a trainee, a substantially opaque convex mirror having a reflecting side and a non-reflecting side, means for removably supporting said sheet in face to face relationship with and in front of said mirror on the reflecting side thereof and directly between an observer of the reflecting side of the mirror and that mirror whereby a trainee can observe his own reflection in said mirror in superimposed relationship with said images to assist in following said movement, the reflecting characteristics of said mirror being such that a trainee by moving toward and away from the mirror can arrange that his observed reflection be of the same size as said images.

2. Apparatus as claimed in claim 1, wherein said mirror is mounted in support means for supporting it at ground level.

3. Apparatus as claimed in claim 2, wherein said support means includes means for supporting said mirror at an angle to the horizontal.

* * * * *